(12) United States Patent
Tanaka et al.

(10) Patent No.: US 6,722,970 B2
(45) Date of Patent: Apr. 20, 2004

(54) VEHICLE AIR CONDITIONER AND MOUNTING STRUCTURE

(75) Inventors: Hisashi Tanaka, Anjo (JP); Yasuyuki Nishi, Kariya (JP); Haruki Ikuta, Hekinan (JP); Kazushi Shikata, Kariya (JP); Kazuya Murata, Kuwana (JP); Tomohiro Kamiya, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/010,589

(22) Filed: Nov. 13, 2001

(65) Prior Publication Data

US 2002/0068521 A1 Jun. 6, 2002

(30) Foreign Application Priority Data

Nov. 13, 2000 (JP) .................................. 2000-345708
Aug. 20, 2001 (JP) .................................. 2001-249417

(51) Int. Cl.$^7$ ................................................ B60H 3/00
(52) U.S. Cl. ......................... 454/156; 62/239; 165/41
(58) Field of Search ............................. 454/156, 121; 62/239; 165/41, 42

(56) References Cited

U.S. PATENT DOCUMENTS

| | | | | |
|---|---|---|---|---|
| 4,467,706 A | * | 8/1984 | Batcheller et al. | ............. 454/70 |
| 4,679,730 A | * | 7/1987 | Uchida | ................... 237/12.3 R |
| 5,839,506 A | * | 11/1998 | Honda et al. | ................. 165/203 |
| 6,101,828 A | * | 8/2000 | Shikata et al. | ................. 62/244 |
| 6,178,764 B1 | | 1/2001 | Tanaka et al. | |
| 6,382,712 B1 | * | 5/2002 | Bruss | ..................... 296/190.09 |
| 6,394,527 B2 | * | 5/2002 | Ohno et al. | .................... 296/72 |

* cited by examiner

Primary Examiner—Derek Boles
(74) Attorney, Agent, or Firm—Harness, Dickey & Pierce, PLC

(57) ABSTRACT

In a vehicle air conditioner, a blower case for accommodating a blower is connected to an air conditioning case for accommodating an evaporator and the like by a connection duct made of a vibration-absorption material. Therefore, a vibration, transmitted from the blower case to the air conditioning case, can be effectively absorbed by the connection duct, thereby reducing the vibration transmitted from the air conditioning case to a steering wheel unit through a supporting member.

12 Claims, 10 Drawing Sheets

VEHICLE AIR CONDITIONER AND MOUNTING STRUCTURE

CROSS-REFERENCE TO RELATED APPLICATIONS

This application is related to and claims priority from Japanese Patent Applications No. 2000-345708 filed on Nov. 13, 2000 and No. 2001-249417 filed on Aug. 20, 2001, the contents of which are hereby incorporated by reference.

BACKGROUND OF THE INVENTION

1. Field of the Invention

The present invention relates to a vehicle air conditioner supported by and fixed to a supporting member for supporting a vehicle steering wheel unit inside a dashboard.

2. Description of Related Art

In a conventional vehicle structure, an air conditioner is supported by and is fixed to a supporting member (reinforcement bar), extending in a vehicle right-left direction, for supporting a vehicle steering wheel unit. Therefore, the air conditioner and the supporting member are integrated (modularlized) with each other, and a vehicle assembly method can be simplified. However, when the air conditioner is fixed to the supporting member, a vibration generated due to the operation of a blower of the air conditioner is readily transmitted to the steering wheel unit through the supporting member.

SUMMARY OF THE INVENTION

In view of the foregoing problem, it is an object of the present invention to restrict vibration, generated due to operation of a blower, from being transmitted to the steering wheel unit.

According to the present invention, an air conditioner of a vehicle includes a blower case for accommodating a blower, an air conditioning case for accommodating a temperature adjusting unit, and a connection duct for connecting the blower case and the air conditioning case. Therefore, air flows from the blower case to the air conditioning case through the connection duct. In addition, the blower case and the air conditioning case are disposed to be supported by and to be fixed to the supporting member, and the connection duct is made of a vibration-absorption material. Because the connection duct for connecting the blower case and the air conditioning case is made of the vibration-absorption material, the vibration transmitted from the blower case to the air conditioning case can be absorbed by the connection duct among the vibration generated due to the operation of the blower. Thus, the vibration of the air conditioning case can be reduced, and the vibration transmitted from the air conditioning case to the supporting member can be reduced, thereby reducing the vibration transmitted to the steering wheel unit. Since the connection duct absorbs the vibration, a new component for absorbing the vibration is not required.

Alternatively, the blower case is connected to an inside/outside air switching box through a connection duct made of a vibration-absorption material. Therefore, when the inside/outside air switching box is fixed to the supporting member for supporting the steering wheel unit, a vibration transmission from the blower case to the inside/outside air switching box can be reduced by the connection duct, and the vibration transmitted from the air conditioner case to the supporting member can be reduced, thereby reducing the vibration transmitted to the steering wheel unit.

According to the present invention, in a mounting structure of an air conditioner on a vehicle, a supporting member for supporting a steering wheel unit is disposed inside a dashboard of the vehicle, a bracket is provided on a case for accommodating a blower and a temperature adjusting unit, and a vibration-absorption member is disposed between the supporting member and the bracket to absorb vibration using elastic deformation of the vibration-absorption member. Accordingly, vibration transmitted from the case to the supporting member can be absorbed by the vibration-absorption member, and vibration transmitted to the steering wheel unit from the case of the air conditioner can be reduced.

Preferably, at least a part of a blower casing of the case is fixed to the supporting member, at a vehicle-side fixing portion at which the supporting member is fixed to a vehicle body. Because the vehicle-side fixing portion is strongly fixed to the vehicle body, when the blower casing is fixed to the vehicle-side fixing portion, vibration transmitted from the blower casing to the supporting member can be effectively reduced at the vehicle-side fixing portion, and the vibration transmitting to the steering wheel unit can be effectively reduced.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
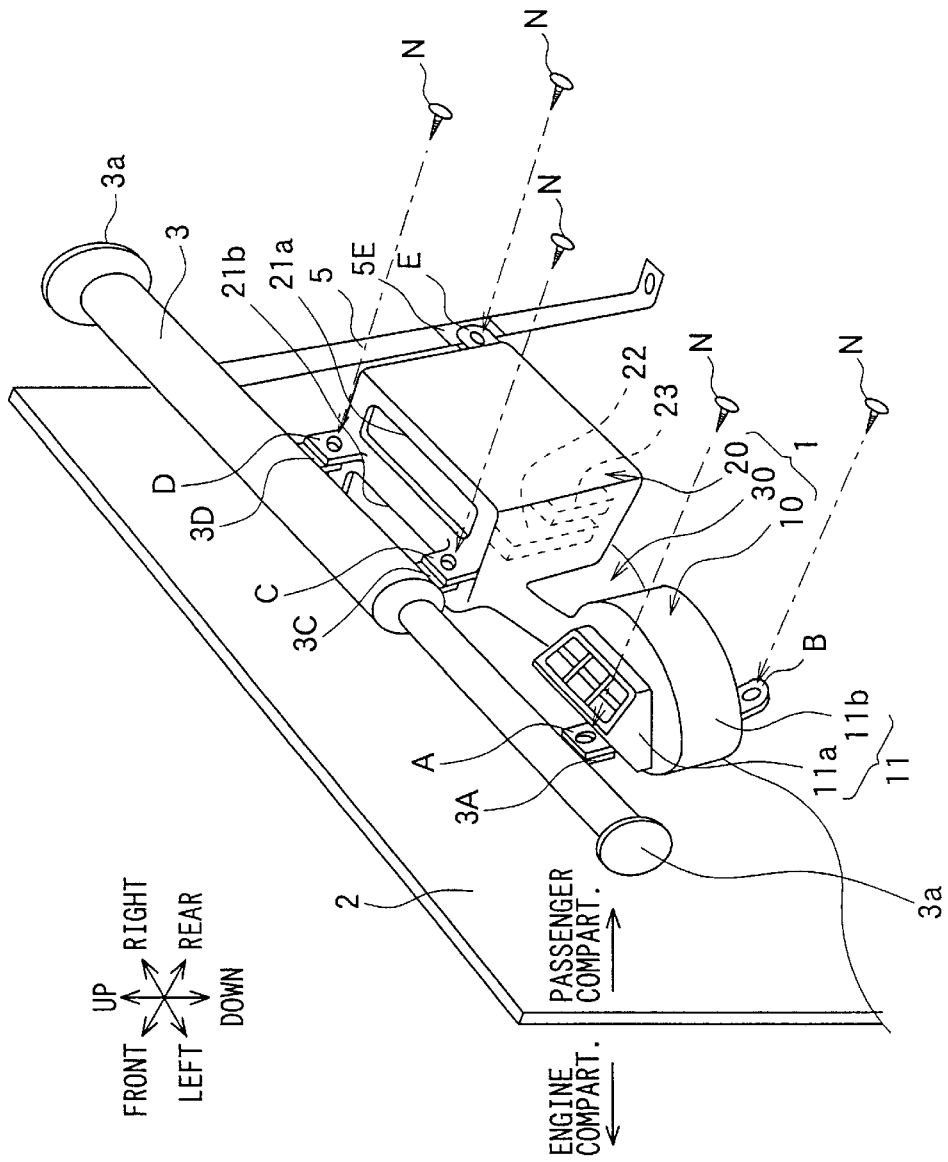
FIG. 1 is a perspective view showing a mounting state of an air conditioner on a vehicle according to a first embodiment of the present invention.

A first preferred embodiment of the present invention will be now described with reference to FIGS. 1–5B. In the first embodiment, an air conditioner 1 is mounted on a vehicle as shown in FIG. 1 to correspond to arrangement directions in a vehicle front-rear direction, a vehicle right-left direction and a vehicle up-down direction, respectively. The air conditioner 1 is supported by and fixed to a strengthening member (supporting member) 3. The strengthening member 3 is located at a side of a vehicle passenger compartment with respect to a partition wall (fire wall) 2 disposed between an engine compartment and the passenger compartment, and is located inside a vehicle dashboard (not shown). The strengthening member 3 extends in the vehicle right-left direction, and is for reinforcing a vehicle body.

Before the strengthening member 3 is attached to the vehicle, various apparatuses such as audio apparatuses other than the air conditioner 1 are integrally attached to the strengthening member 3, and are modularlized as an integrated structure. Then, this integrated structure is attached to the vehicle, so that the vehicle assembly step can be simplified.

Figure 5A:
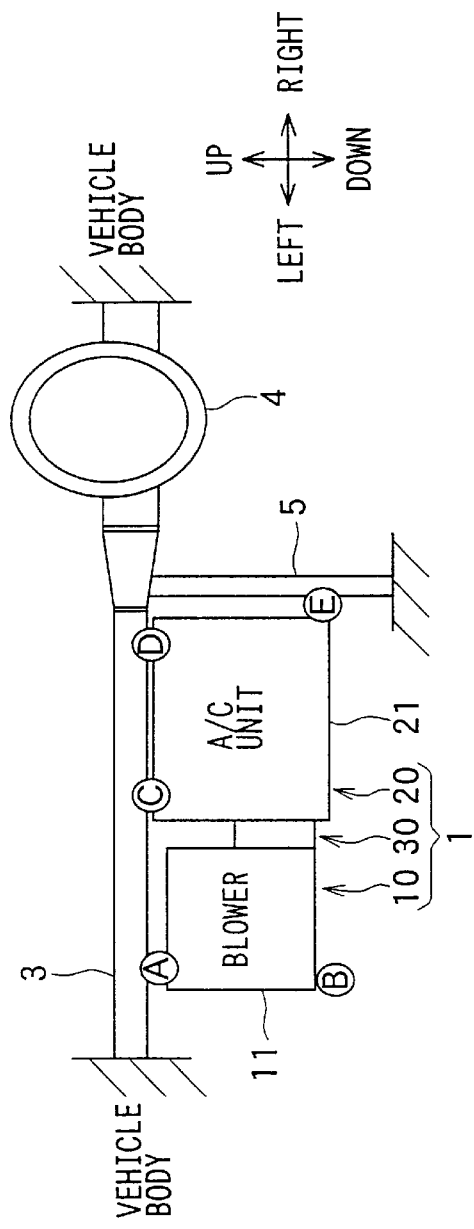
FIG. 5A is a schematic diagram showing a mounting state of the air conditioner on a vehicle on which vibration tests have been performed by the present inventors.

The strengthening member 3, made of a metal such as an iron group metal, is formed in a bar shape (reinforcement bar), and this bar shape includes a pipe having a hollow portion therein. The pipe can have a cross-sectional shape such as a rectangular shape, a circular shape or the like. The strengthening member 3 reinforces the vehicle, and supports a steering wheel unit 4 as shown in FIG. 5A. In a right-steering vehicle, a supporting stay (not shown) of the steering wheel unit 4 is fixed to the strengthening member 3 at the right side by welding and the like. A housing portion (not shown) of the steering wheel unit 4 is supported by and fixed to this supporting stay made of a metal such as an iron group metal.

Side brackets 3a are fixed to both ends of the strengthening member 3 in the vehicle right-left direction by welding and the like, respectively. The side brackets 3a are attached and fixed to the side portions of the vehicle body, respectively, by fastening members such as bolts and nuts. A brace member (reinforcement member) 5 is disposed on the strengthening member 3 at the right side position in the right-left direction, to reinforce the strengthening member 3 from the lower side. The upper end of the brace member 5 is fixed to a brace connection bracket, fixed to the reinforcement member 3 by welding and the like, by a fastening member such as a bolt and nut. The lower end of the brace member 5 is fixed to the bottom surface of the vehicle body by the fastening member such as a bolt and a nut.

Figure 2:
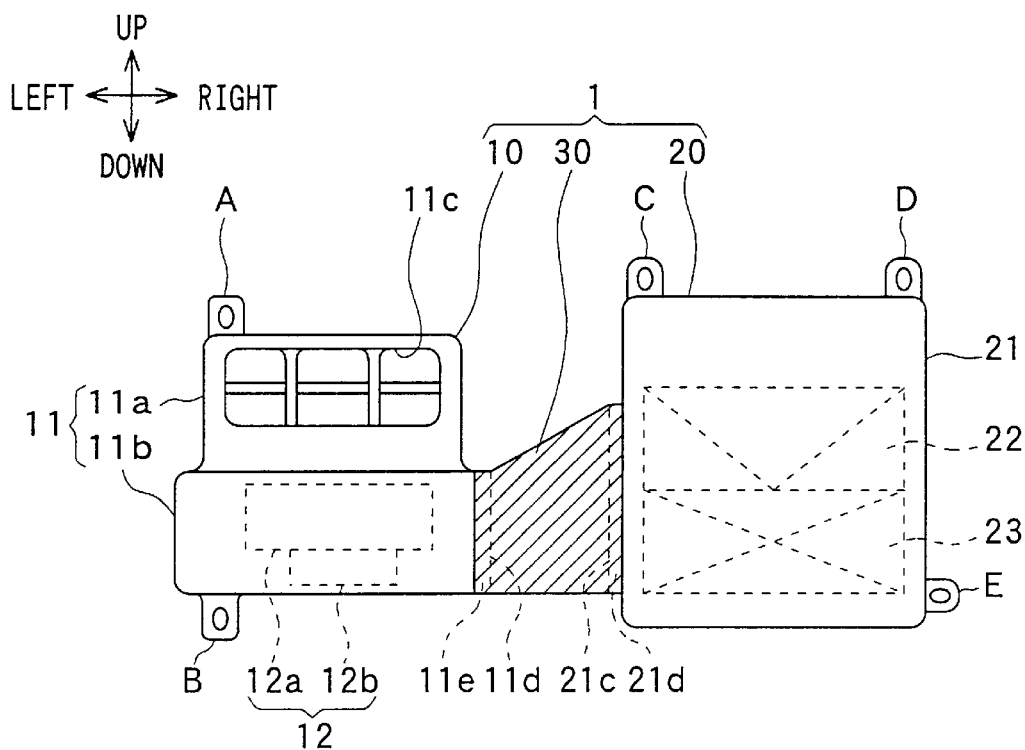
FIG. 2 is a front view showing the vehicle air conditioner according to the first embodiment.

As shown in FIG. 2, the air conditioner 1 is constructed by a blower unit 10, an air conditioning unit 20 and a connection duct 30 indicated by a slant line portion shown in FIG. 2. In the right-steering vehicle, the blower unit 10 is disposed at the vehicle left side (i.e., at the side of a front seat next to a driver seat), and the air conditioning unit 20 is located substantially at the center portion in the vehicle right-left direction.

The blower unit 10, for blowing inside air and outside air toward the air conditioning unit 20, includes a blower case 11, made of resin, composed of an inside/outside air switching box 11a and a blower casing 11b. The inside/outside air switching box 11a has an inside air suction port 11c from which inside air is sucked and an outside air suction port (not shown) from which outside air is sucked, and an inside/outside air switching damper (not shown) for selectively opening and closing these suction ports 11c is disposed within the inside/outside air switching box 11a. Further, within the blower casing 11b, a centrifugal blower 12 is disposed. The centrifugal blower 12 is constructed by a centrifugal fan 12a for blowing air sucked from the inside air suction port 11c or the outside air suction port, and a driving motor 12b for driving the fan 12a. An air duct portion 11e, which protrudes in a cylindrical shape to define an air port 11d, is formed in the blower casing 11b at a downstream air side of the blower fan 12a. The connection duct 30 is connected to the air duct portion 11e. The blower case 11 defines an air passage therein, through which air flows from the inside air suction port 11c or the outside air suction port to the air port 11d.

The air conditioning unit 20 adjusts the temperature of air blown from the blower unit 10, and introduces the conditioned air into the passenger compartment. The air conditioning unit 20 includes an air conditioning case 21, made of resin, connected to the connection duct 30. The air conditioning case 21 accommodates an evaporator (temperature adjustment unit) 22 as a cooling heat exchanger for cooling air, a hot-water-type heater core (temperature adjustment unit) 23 as a heating heat exchanger for heating air, an air mixing damper (not shown) as a temperature adjustment unit and the like.

A face air outlet 21a and a defroster air outlet 21b are provided on the air conditioning case 21 at the upper surface portion. The face air outlet 21a communicates with a face blow grill (not shown), located on the dashboard, from which air is blown to the head portion of the passenger in the passenger compartment. The defroster air outlet 21b communicates with a defroster blow grill (not shown) through which air is blown to the inside surface of a windshield. Further, a foot air outlet (not shown) is provided on the air conditioning case 21. The foot air outlet communicates with a foot blow grill from which air is blown to the foot portion of the passenger in the passenger compartment. A damper unit (not shown) such as a plate-shape damper and a rotary damper, for opening and closing these plural air passages, is provided in the air conditioning case 21.

An inflow duct portion 21d, which protrudes in a cylindrical shape to define an inflow port 21c from which air blown from the blower unit 10 flows into the air conditioning case 21, is formed in the air conditioning case 21 at an upstream air side of the evaporator 22. The connection duct 30 is connected to the inflow duct portion 21d. The air conditioning case 21 defines an air passage therein, through which air flows from the inflow port 21c toward the air outlets 21a, 21b.

Figure 3:
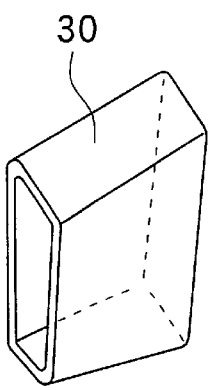
FIG. 3 is a perspective view showing a connection duct of the vehicle air conditioner according to the first embodiment.

The connection duct 30 shown in FIG. 3 is made of a vibration-absorption material such as a vibration-absorption resin. In the first embodiment, all of the connection duct 30 is molded by a soft material. The air duct portion 11e of the blower case 11 and the inflow duct portion 21d of the air conditioning case 21 are air-tightly inserted into both end parts of the connection duct 30, respectively. Both end parts of the connection duct 30 are elastically deformed, so that the peripheral surfaces of the air duct portion lie and the inflow duct portion 21d are air-tightly press-fitted into the end parts of the connection duct 30, respectively.

Next, the mounting structure of the air conditioner 1 on the vehicle will be now described. Air-conditioning side brackets A, B each having an attachment hole are integrally formed with the blower case 11 on the upper and lower surfaces, respectively. Air-conditioning side brackets C,D each having an attachment hole are integrally formed with the air conditioning case 21 on the upper surface, and an air-conditioning side bracket E having an attachment hole is integrally formed with the air conditioning case 21 on the side surface.

Metal brackets 3A, 3C, 3D are fixed to the strengthening member 3 by welding or the like at the positions corresponding to the brackets A, C, D located in the cases 11, 21 on the upper surfaces, respectively. A metal bracket 5E is fixed to the brace member 5 by welding or the like at the position corresponding to the air-conditioning side bracket E located in the air conditioning case 21 on the side surface. The air-conditioning side brackets A, C, D, E are fixed to the metal brackets 3A, 3C, 3D, 5E by using screws N, respectively. The air-conditioning side bracket B is fixed to the fire wall 2 by using the screw N. The brackets A, C, D support the load of the air conditioner 1, and the air-conditioning side brackets B, E can be also used for reducing the vibration of the air conditioner 1.

Next, the operation of the air conditioner 1 having the above structure will be now described. Air, sucked from the inside air suction port 11c or the outside air suction port of the blower case 11, is blown by the blower fan 12a to flow substantially in a horizontal direction within the blower casing 11b, and flows into the air conditioning case 21 from the air port lid to the inflow port 21c thereof through the connection duct 30. Then, air flows into the evaporator 22 from below upwardly, to be dehumidified and cooled. Thereafter, air from the evaporator 22 flows into the heater core 23 to be heated. In the heater core 23, the temperature of air is controlled by a hot-water control valve (not shown). Conditioned air heated to the requested temperature in the heater core 23 is blown into the passenger compartment from blow grills through the air outlets such as the face air outlet 21a and the defroster air outlet 21b.

Figure 5B:
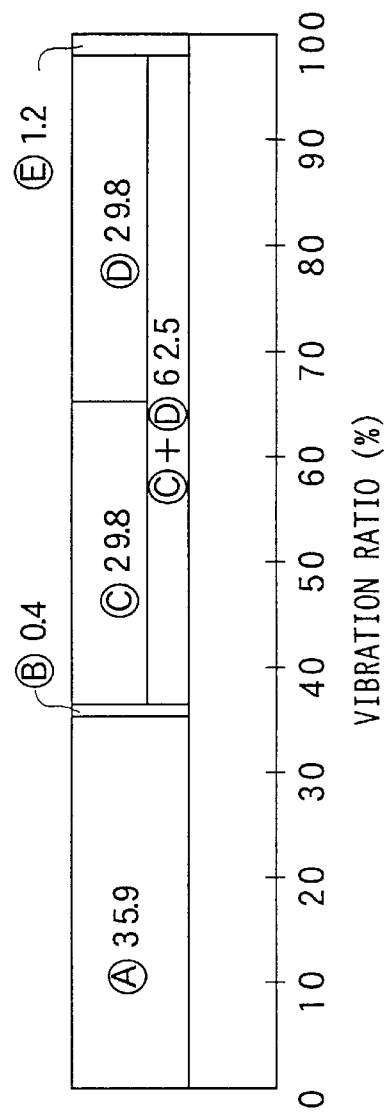
FIG. 5B is a view for explaining the vibration test results, according to the first embodiment.

The inventors have experimentally studied a fixing portion, through which a large amount of vibration is transmitted from the air conditioner 1 to the strengthening member 3, among the plural fixing portions at which the air conditioner 1 is fixed to the strengthening member 3. In FIGS. 5A, A–E indicate the brackets A–E provided in the air conditioner 1, respectively. In the mounting state of the air conditioner 1 according to the first embodiment on the vehicle, as shown in FIG. 5A, while the blower 12 is operated, the vibration (acceleration) is detected at the brackets A–E. FIG. 5B shows a ratio of the vibration transmitted through each of the brackets A–E to the entire vibration transmitted from the air conditioner 1 to the steering wheel unit 4 through the strengthening member 3. As shown in FIG. 5B, the vibration transmitted through the brackets A, C, D accounts for 98.4% of the transmitted entire vibration, and the vibration transmitted through the brackets C, D accounts for more than half of the transmitted entire vibration. Generally, a large amount of vibration is transmitted from the blower case 11 containing the blower 12 to the strengthening member 3. However, according to experiments of the present inventors, it has been found that a large amount of vibration (62.5% of the transmitted entire vibration) is also transmitted from the air conditioning case 21 to the strengthening member 3.

In the first embodiment, as described above, the connection duct 30 connecting the blower case 11 and the air conditioning case 21 is made of the vibration-absorption resin material. Therefore, the vibration transmitted from the blower case 11 to the air conditioning case 21 can be absorbed by the connection duct 30 among the vibration generated by the operation of the blower 12. Thus, the vibration of the air conditioning case 21 can be reduced, and the vibration transmitted from the air conditioning case 21 to the strengthening member 3 can be reduced, thereby reducing the vibration transmitted to the steering wheel unit 4.

Figure 4:
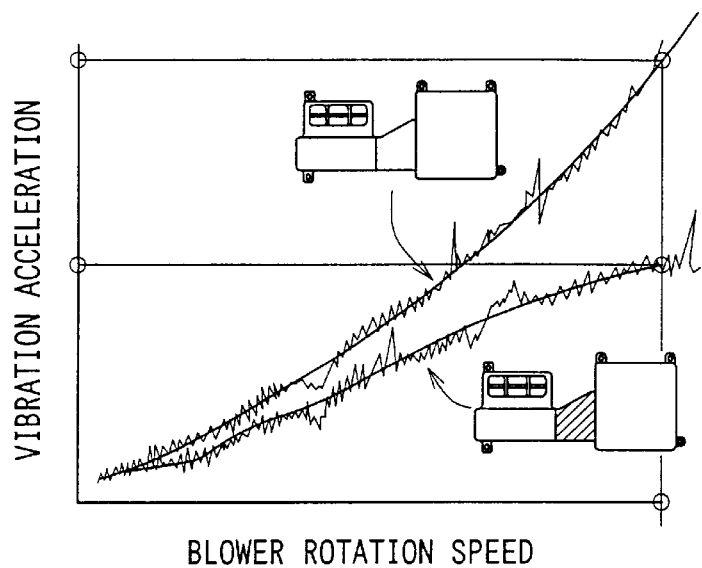
FIG. 4 is a graph for explaining a vibration-reduction effect in the vehicle air conditioner according to the first embodiment.

FIG. 4 shows a test result where the vibration is detected in the steering wheel unit 4 when the connection duct 30 is molded by the vibration absorption resin (slant line portion) and when being molded by non-vibration-absorption resin. This graph of FIG. 4 shows the relationship between the rotation speed (rpm) of the blower 12 and the vibration acceleration ($m/s^2$) detected in the steering wheel unit 4. As shown in this test result, when the rotation speed of the blower 12 is high, the vibration acceleration in the steering wheel unit 4 can be made lower in a case where the connection duct 30 has the vibration-absorption property, as compared with a case where the connection duct 30 does not have the vibration absorption property.

In the first embodiment, because the connection duct 30, through which air flows, has the vibration-absorbing function, the vibration transmitted to the steering wheel unit 4 can be reduced without a new component for absorbing the vibration.

Figure 6:
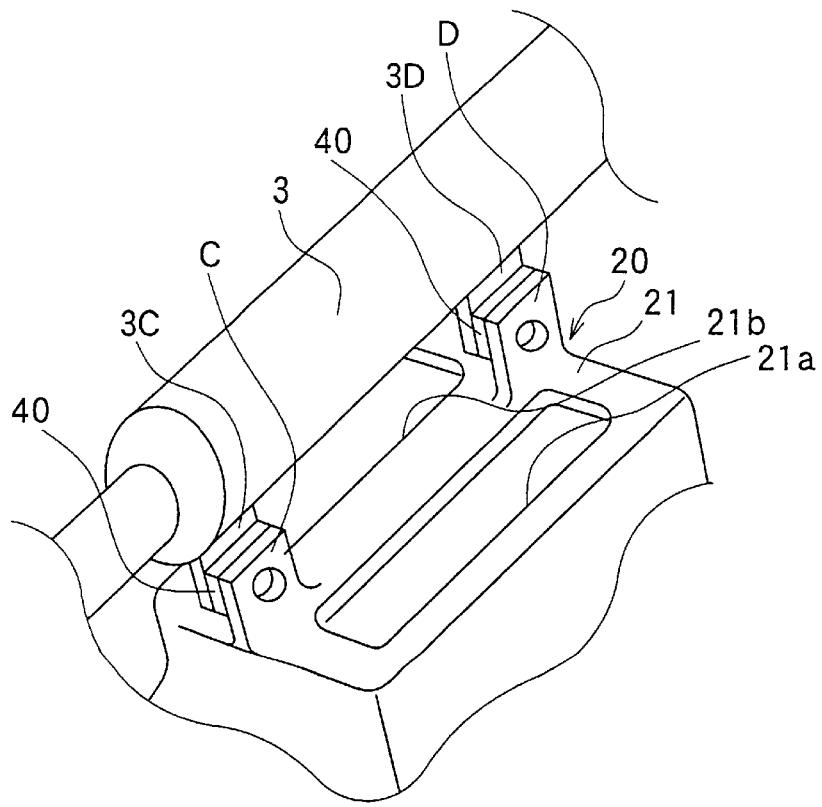
FIG. 6 is a perspective view showing bracket portions of a vehicle air conditioner according to a second embodiment of the present invention.

A second preferred embodiment of the present invention will be now described with reference to FIG. 6.

In the above-described first embodiment, the air-conditioning side brackets A, C, D, integrated with the blower case 11 and the air conditioning case 21, are fixed to the metal brackets 3A, 3C, 3D for supporting the load of the air conditioner 1, by using the screws N, respectively. However, in the second embodiment, the brackets A, C, D of the air conditioner 1 are fixed to the metal brackets 3A, 3C, 3D through plate-shaped rubber members (vibration absorption member) 40, respectively, as shown in FIG. 6. That is, the rubber members 40 are placed between the brackets A, C, D of the air conditioner 1 and the metal brackets 3A, 3C, 3D, and thereafter, the brackets A, C, D of the air conditioner 1 and the metal brackets 3A, 3B, 3D are fastened through the rubber members 40, by using the screws N. In this case, the plate-shaped rubber member 40 absorbs vibration using elastic deformation. Therefore, the vibration transmitted from the blower case 11 and the air conditioning case 21 to the strengthening member 3 can be absorbed by the rubber members 40. Thus, the vibration transmitted to the strengthening member 3 can be reduced, and the vibration transmitted to the steering wheel unit 4 can be also reduced.

In the second embodiment, the blower case 11 and the air conditioning case 21 are integrated with each other while the connection duct 30 described in the first embodiment is eliminated. Alternatively, the blower case 11 and the air conditioning case 21 can be integrated through a connection duct made of a vibration-absorbing material or a non-vibration-absorbing material. Further, in the second embodiment of the present invention, the rubber member 40 can be disposed between at least one of the air-conditioning side brackets A, C, D and at least one of the metal brackets 3A, 3C, 3D. Further, the rubber member 40 can be placed between the air-conditioning side bracket B and the metal bracket, and can be placed between the air-conditioning side bracket E and the metal bracket 5E.

A third preferred embodiment of the present invention will be now described with reference to FIGS. 7 and 8.

Figure 7:
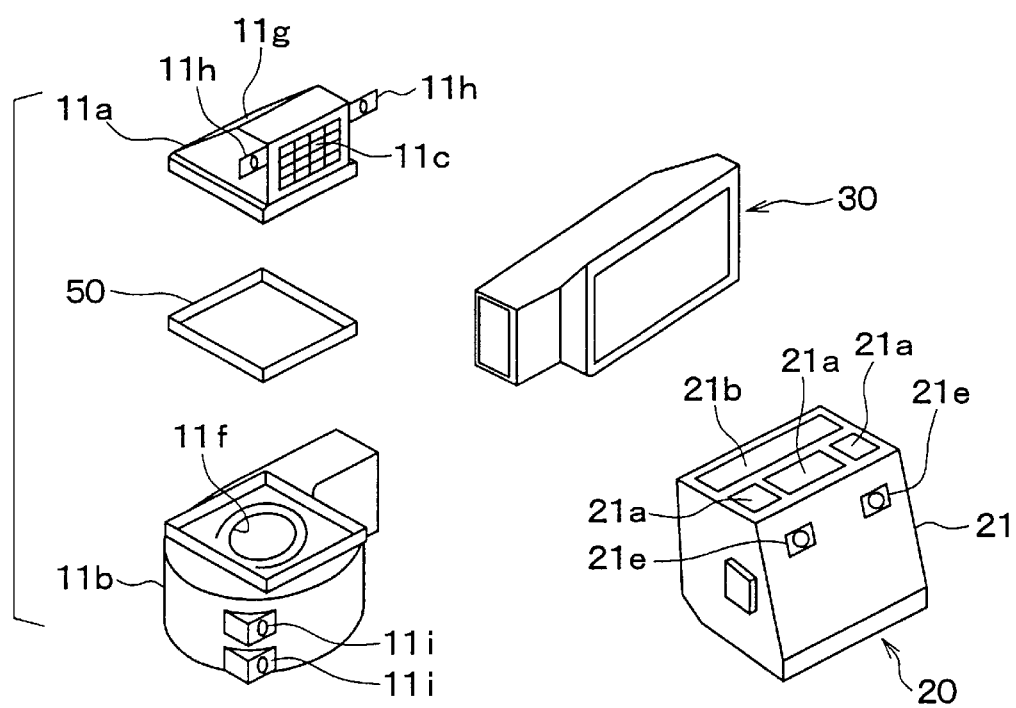
FIG. 7 is a disassembled perspective view showing an air conditioner according to a third embodiment of the present invention.

As shown in FIG. 7, in the third embodiment, the blower case 11 described in the above first embodiment is separated into the inside/outside air switching box 11a and the blower casing 11b. The inside/outside air switching box 11a and the blower casing 11b are connected with each other by a connection duct 50 made of the vibration absorption material. The connection duct 50 is molded by a soft material, and is suitably formed of the vibration absorption by blow molding. Similarly to the first embodiment, the blower casing 11b is connected to the air conditioning case 21 through the connection duct 30. In FIG. 7, the blower casing 11b has a bell-mouth suction port 11f from which air is sucked into the blower casing 21. The inside/outside air switching box 11a has an outside air suction port 11g from which outside air (air outside the passenger compartment) is introduced.

Figure 8:
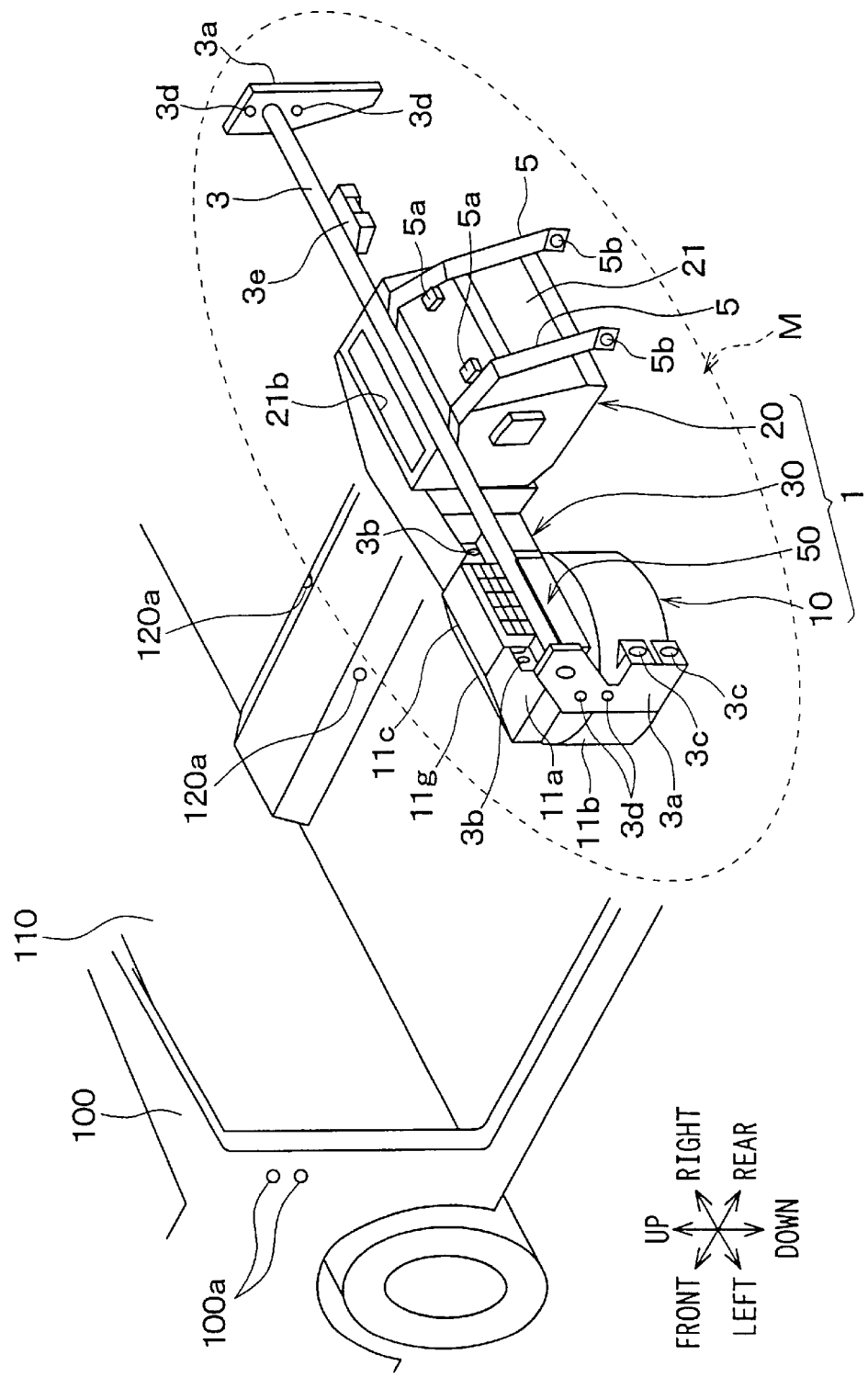
FIG. 8 is a perspective view showing an integrated structure including the air conditioner and a strengthening member, according to the third embodiment.

As shown in FIG. 8, the air conditioner 1 shown in FIG. 7 is attached to the strengthening member 3 to modularlize an integrated structure M. Further, the strengthening member 3 includes two brace members 5 substantially at its center portion in the vehicle right-left direction. Attachment seats 21e, provided on the air conditioning case 21 at the vehicle rear side, are fixed to attachment seats 5a provided on the brace members 5 by the fastening members such as screws, so that the air conditioning case 21 is supported by the brace member 5. Further, attachment seats 11h, provided on the inside/outside air switching box 11a at the vehicle rear side, are fixed to attachment seat 3b provided on the strengthening member 3 by the fastening member such as screws, so that the inside/outside air switching box 11a is supported by the strengthening member 3. Further, attachment seats 11i, provided on the blower casing 11b at the vehicle rear side, are fixed to attachment seats 3c provided on the side bracket 3a by using the fastening members such as screw, so that the blower casing 11b is supported by the side bracket 3a.

Then, the side bracket 3a is fixed to a vehicle body 100 by fastening the fastening members such as bolts into attachment holes 3d (vehicle-side fixing portion) provided on the side bracket 3a and attachment holes 100a provided on the vehicle body 100, so that the integrated structure M is tightly supported by the vehicle body 100. The attachment holes 100a are provided at the right and left end portions of the vehicle body 100, and are located at the vehicle rear side of the partition wall 110 for partitioning the engine compartment and the passenger compartment from each other. The attachment holes 3d are positioned in a vibration transmittance route from the attachment seat 11i of the blower casing 11b to the steering wheel unit 4 through the side bracket 3a and the strengthening member 3.

Attachment seats 5b, provided in the brace members 5 at the lower ends, are fixed to attachment seats 120a provided in the center tunnel portion 120 of the vehicle body 100 on the floor surface by the fastening members such as bolts. In FIG. 8, a supporting stay 3e, for supporting the steering wheel unit 4, is fixed to the strengthening member 3 by welding or the like.

In the third embodiment, among the vibration generated by the operation of the driving motor 12b of the blower 12, the vibration transmitted from the blower casing 11b to the air conditioning case 21 can be absorbed by the connection duct 30, and the vibration transmitted from the blower casing 11b to the inside/outside air switching box 11a can be absorbed by the connection duct 50. Thus, the vibration can be reduced both in the inside/outside air switching box 11a and in the air conditioning case 21, and the vibration transmitted to the strengthening member 3 can be greatly reduced, thereby reducing the vibration transmitted to the steering wheel unit 4.

In the third embodiment, further, the vehicle-side fixing portions 3d of the side bracket 3a are located in a vibration transmittance route from the fixing portion 3c of the blower casing 11b to the steering wheel unit 4 through the side bracket 3a and the strengthening member 3. Therefore, the vibration transmitted from the blower casing 11b to the strengthening member 3 through the side bracket 3a can be effectively reduced in the vehicle-side fixing portions 3d.

Generally, a cowl (not shown), extending in the vehicle right-left direction, is disposed on the vehicle rear side of the partition wall 110, and the cowl has an opening communicating with the outside. The outside air suction port 11g of the inside/outside air switching box 11a is press-fitted into the opening of the cowl through a packing member (urethane foam). Accordingly, when the inside/outside air switching box 11a vibrates greatly, it is difficult to ensure the air-sealing performance of the packing member. In the third embodiment, however, since the vibration of the inside/outside air switching box 11a can be reduced, the inside/outside air switching box 11a can be rigidly fixed to the strengthening member 3 without using the rubber member 40 disposed between the metal bracket 3A and the air-conditioner side bracket A as described in the second embodiment. Therefore, the air-sealing performance of the packing member can be ensured.

Figure 9:
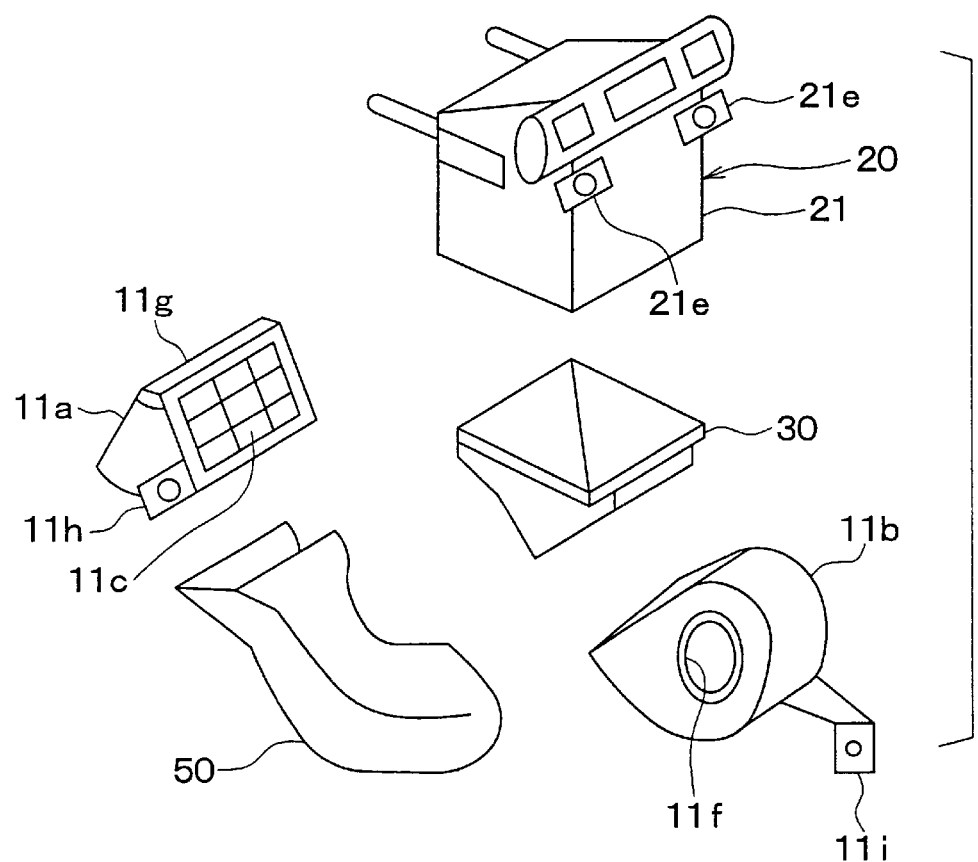
FIG. 9 is a disassembled perspective view showing an air conditioner according to a fourth embodiment of the present invention.
Figure 10:
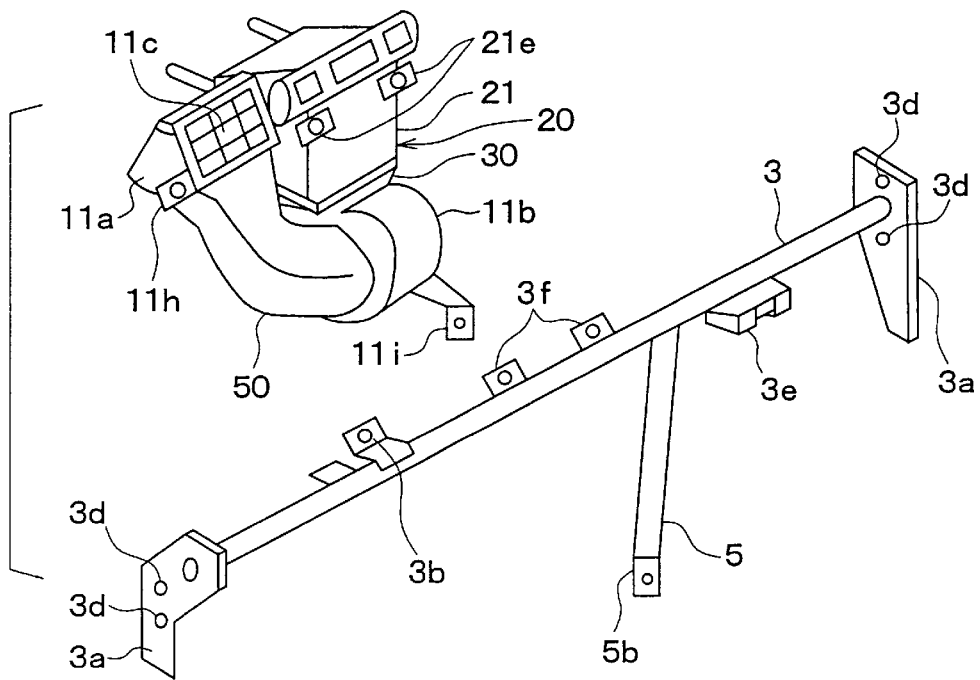
FIG. 10 is a disassembled perspective view showing the air conditioner and a strengthening member according to the fourth embodiment.

A fourth preferred embodiment of the present invention will be now described with reference to FIGS. 9–11. In the above-described first embodiment, the blower casing 11b is disposed at the side of the air conditioning case 21 in the vehicle right-left direction. However, in an air conditioner 1 of the fourth embodiment, as shown in FIG. 9, the blower casing 11b is disposed below the air conditioning case 21. As shown in FIG. 10, the attachment seats 21e, provided in the air conditioning case 21 at the vehicle rear side, are fixed to the attachment seats 3f provided in the strengthening member 3 by the fastening members such as screws, so that the air conditioning case 21 is supported by the strengthening member 3. The attachment seat 11h, provided in the inside/outside air switching box 11a at the vehicle rear side, is fixed to the attachment seat 3b of the strengthening member 3 by the clamping member such as a screw, so that the inside/outside air switching box 11a is supported by the strengthening member 3. The attachment seat 11i, extending from the blower casing 11b to the vehicle rear side, is fixed to the attachment seat (vehicle-side fixing portion, blower-side fixing portion) 5b provided in the brace member 5 by the fastening member such as a screw, so that the blower casing 11b is supported by the brace member 5.

Figure 11:
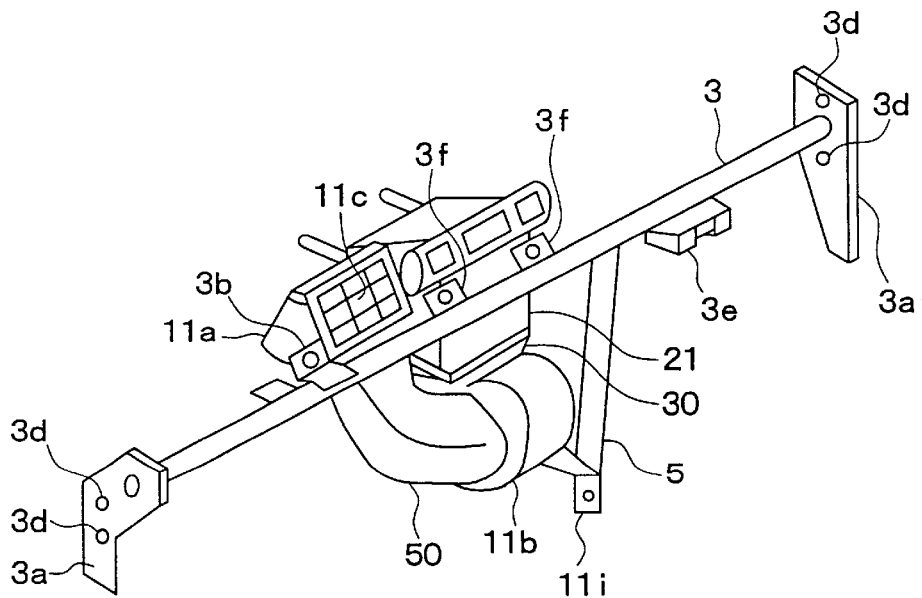
FIG. 11 is a perspective view showing an integrated structure including the air conditioner and the strengthening member, according to the fourth embodiment.

As shown in FIG. 11, an integrated structure constructed as in the above manner is fixed to the vehicle body 100 by fitting the fastening members such as bolts into the attachment holes 3d provided in the side brackets 3a and into the attachment holes 10a provided in the vehicle body 100, so that the integrated structure is supported by the vehicle body 100. The Attachment seat 5b of the brace member 5 is fixed to attachment seat 120a provided in the center tunnel portion 120 of the vehicle body 100 on the floor surface by the clamping member such as a bolt. That is, the blower casing 11b is fixed to the attachment seat 5b at which the brace member 5 is fixed to the tunnel portion 120. Accordingly, the vibration transmitted from the blower casing 11b to the strengthening member 3 through the brace member 5 can be effectively reduced at the attachment seat 5d of the brace member 5.

In addition, in the fourth embodiment, the connection duct 50 made of a vibration-absorbing material is disposed, so that the inside/outside air switching box 11a and the blower casing 11b are connected through the connection duct 50. Therefore, the vibration transmitted from the blower casing 11b to the inside/outside air switching box 11a can be reduced. Further, the connection duct 30 made of a vibration-absorbing material is disposed, so that the blower casing 11b is connected to the air conditioning case 21 at a lower side through the connection duct 30. Therefore, the vibration transmitted from the blower casing 11b to the air conditioning case 21 can be reduced.

Figure 12:
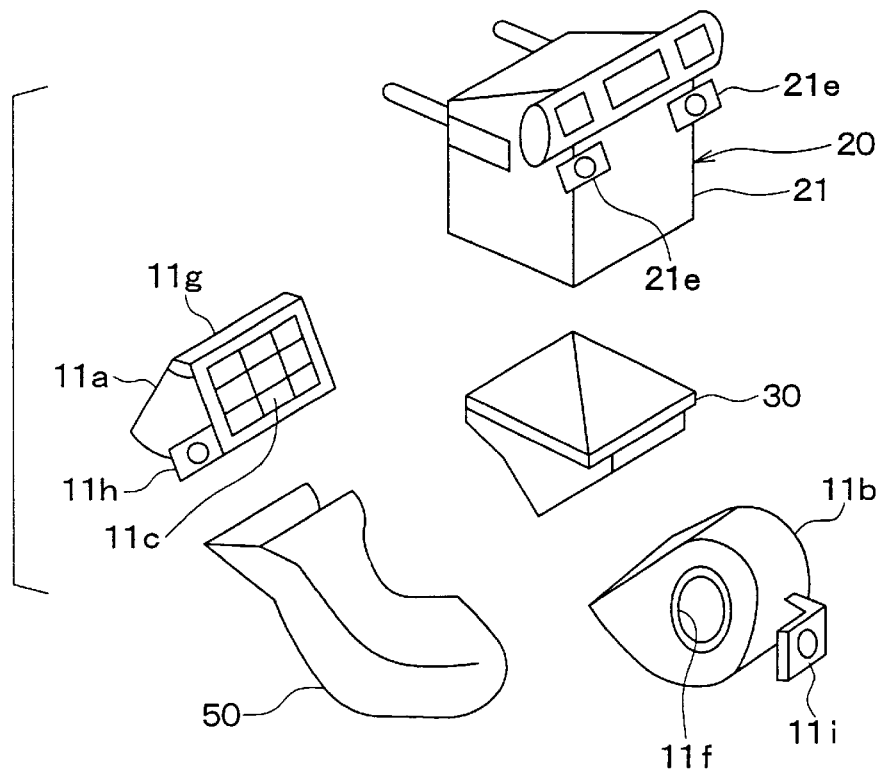
FIG. 12 is a disassembled perspective view showing an air conditioner according to a fifth embodiment of the present invention.
Figure 13:
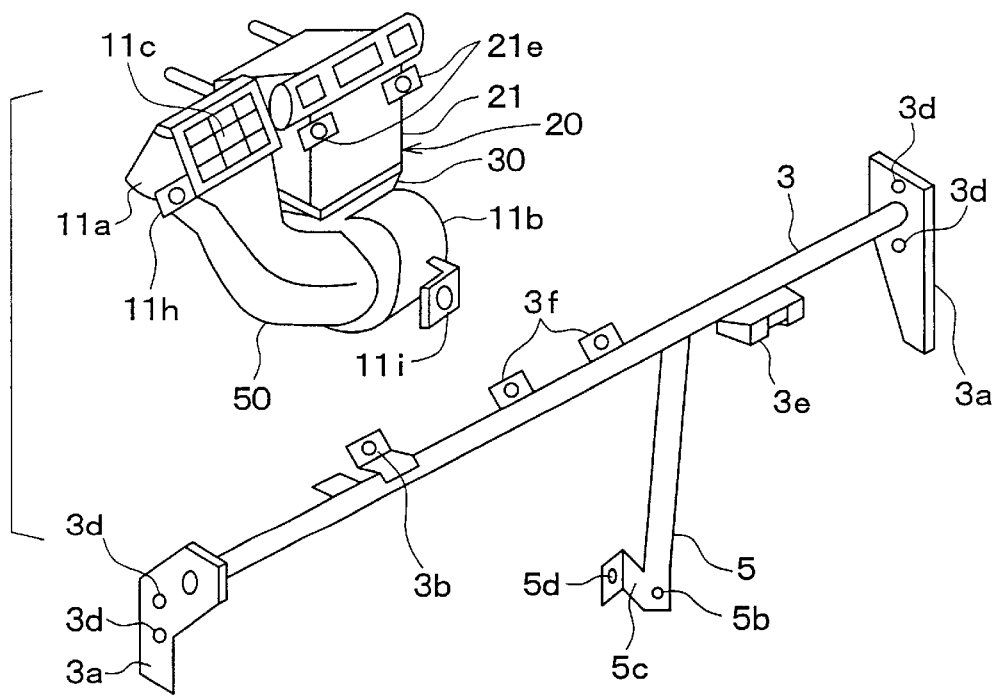
FIG. 13 is a disassembled perspective view showing the air conditioner and a strengthening member according to the fifth embodiment.

A fifth preferred embodiment of the present invention will be now described with reference to FIGS. 12 and 13. In the above-described fourth embodiment, the blower casing 11b is fixed directly to the attachment seat 5b of the brace member 5, at which the brace member 5 is fixed to the tunnel portion 120. However, in the fifth embodiment shown in FIGS. 12, 13, an extension portion 5c, extending to the vehicle front side, is formed at the attachment seat (vehicle-side fixing portion) 5b. Further, an attachment seat (blower-side fixing portion) 5d, to which the attachment seat 11i of the blower casing 11b is fixed, is formed on the tip of the extension portion 5c. In the fifth embodiment, the attachment seat 5b is located in a vibration transmission route from the blower-side attachment seat 5d of the brace member 5 to the steering wheel unit 4 through the brace member 5 and the strengthening member 3. Therefore, the vibration transmitted from the blower casing 11b to the strengthening member 3 through the brace member 5 can be effectively reduced at the attachment seat 5d of the brace member 5.

Figure 14:
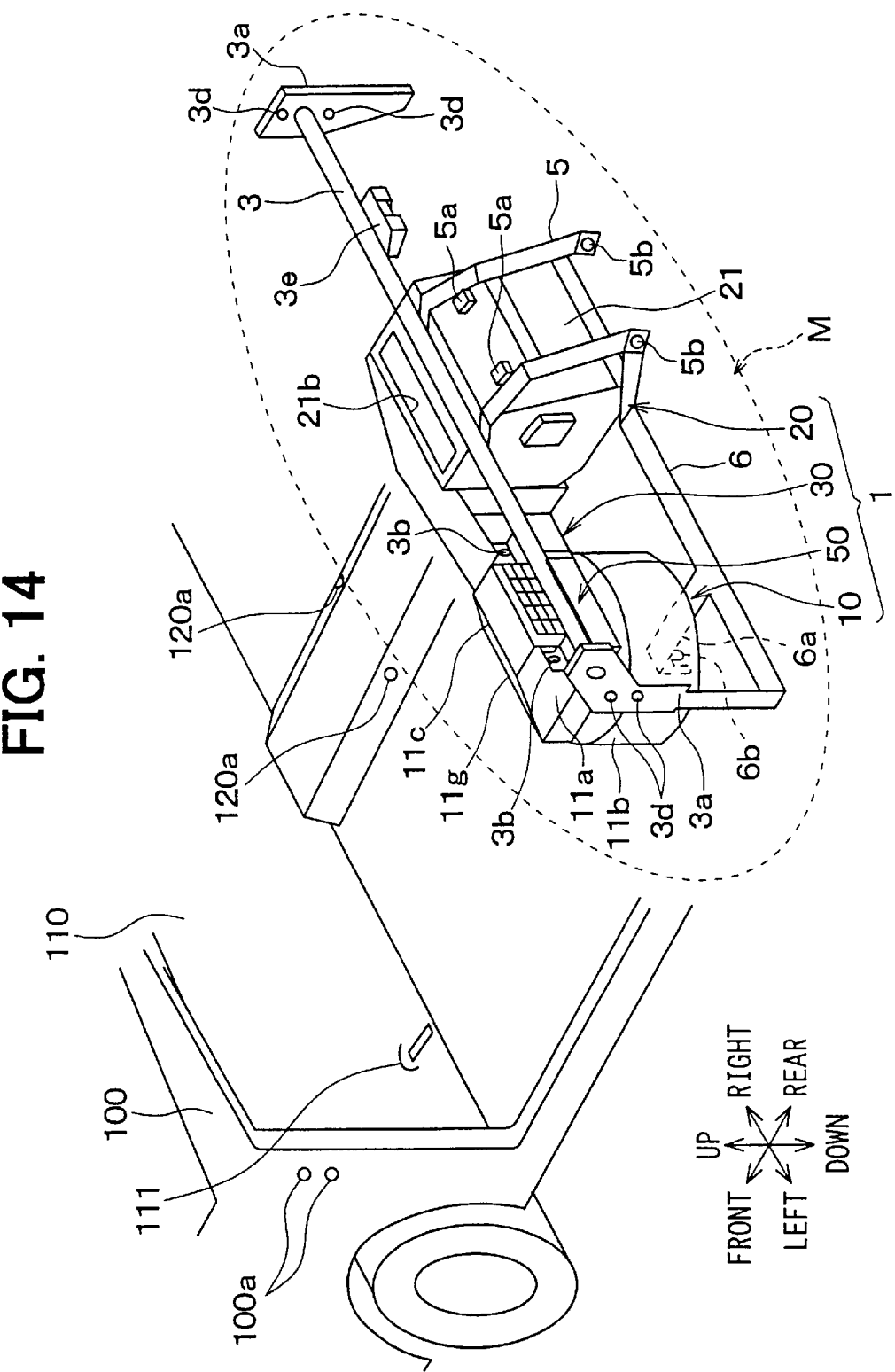
FIG. 14 is a perspective view showing an integrated structure including the air conditioner and the strengthening member, according to a sixth embodiment of the present

A sixth preferred embodiment of the present invention will be now described with reference to FIG. 14. In the sixth embodiment, as shown in FIG. 14, the integrated structure M, modularlized by integrating the air conditioner 1 and the strengthening member 3, includes a metal beam member (connection member) 6 which extends so as to connect the side bracket 3a and the brace member 5. The beam member 6 according to the sixth embodiment is integrated with the side brackets 3a, and it extends in the vehicle right-left direction below the blower casing 11b. One end of the beam member 6 is fixed to the attachment seat 5b of the brace member 5 by the fastening member such as bolt. The beam member 6 includes an extension portion (blower-side fixing portion) 6a extending to the partition wall 110, and an attachment seat 6b provided at the tip of the extension portion 6a is fixed to a stud bolt 111 fixed to the partition wall 110. In the above-described third embodiment, the blower casing 11b is supported by the side bracket 3a. However, in the sixth embodiment, the blower casing 11b is placed on the extension portion 6a of the beam member 6 and is fixed thereto. The beam member 6 also functions as a protector which prevents the lower half body of a passenger from being moved into a lower side of the blower casing 11b.

Although the present invention has been fully described in connection with the preferred embodiments thereof with reference to the accompanying drawings, it is to be noted that various changes and modifications will become apparent to those skilled in the art.

For example, although the connection ducts 30, 50 are made of the vibration-absorption resin in the above first embodiment, they can be made of another vibration-absorption material without being limited to the vibration absorption resin. For example, the connection ducts 30, 50 can be molded by cloth, film-type wraps, rubber, paper and the like. Further, the connection ducts 30, 50 may be formed in a thin shape, so that the vibration can be absorbed due to their deformation.

In the above-described embodiments, the strengthening member 3 has a bar shape (reinforcement bar). However, the strengthening member 3 can be formed into a plate shape, and can be formed as a one portion of the fire wall 2. For example, the upper end of the fire wall 2 is bent so as to cover the upper side of the air conditioner 1. Then, as the strengthening member 3 of the present invention, this covering portion can be used to reinforce the vehicle body 100 and to support the steering wheel unit 4 and the air conditioner 1. Further, the present invention can be applied for any strengthening member 3 having the function for supporting the steering wheel unit 4.

The air-conditioner side bracket E, formed on the side surface of the air conditioning case 1, does not have the function for supporting the air conditioner 1 but has the function for reducing vibration. Therefore, when the air-conditioner side bracket E is made of the vibration absorption resin such as that of the connection duct 30, the vibration transmitted from the air conditioning case 21 to the strengthening member 3 through the brace member 5 can be effectively absorbed by the bracket E, among the vibration generated due to the operation of the blower 12. Thus, the bracket E can effectively reduce the vibration transmitted to the steering wheel unit 4.

In the above-described first and second embodiments, the blower case 11 and the air conditioning case 21 are supported by and fixed to the strengthening member 3 through the brackets 3A, 3C, 3D fixed to the strengthening member 3. However, the cases 11, 21 can be supported by and fixed to the brace member 5, or the blower case 11 can be supported by and fixed to the side bracket 3a.

Although the connection ducts 30, 50 are made of the vibration-absorption resin in the above third to sixth embodiments, at least one of the ducts 30, 50 can be made of the vibration-absorption resin in the present invention. In the above third embodiment, the attachment holes (vehicle-side fixing portion) 3d of the side bracket 3a are positioned in the vibration transmittance route from the attachment seats (blower-side fixing portion) 3c of the side bracket 3a to the steering wheel unit 4 through the side bracket 3a and the strengthening member 3. However, the attachment seats 3c provided on the side bracket 3a can have the attachment holes 3d, and the blower casing 11b can be fixed at the attachment holes 3d. In this case, similarly to the third embodiment, the vibration from the blower casing 11b to the strengthening member 3 through the side bracket 3a can be suitably reduced. In the above-described fourth and fifth embodiments, the connection duct 30 is provided between the air conditioning case 21 and the blower casing 11b. However, the air conditioning 21 and the blower casing 11b can be directly integrated with each other, so that the connection duct 30 can be eliminated.

Such changes and modifications are to be understood as being within the scope of the present invention as defined by the appended claims.

What is claimed is:

1. An air conditioner for a vehicle having a supporting member for supporting a steering wheel unit, the air conditioner comprising:

a blower case defining an air passage;

a blower, disposed in the blower case, for blowing air into a passenger compartment;

a temperature adjusting unit for adjusting temperature of air blown by the blower;

an air conditioning case defining an air passage, the temperature adjusting unit being disposed within the air conditioning case; and a first connection duct for connecting the blower case and the air conditioning case, through which air flows from the blower case to the air conditioning case, wherein:

the blower case and the air conditioning case that are connected by the first connection duct are hung downwardly from the supporting member; and the first connection duct is made of a vibration-absorption material.

2. The air conditioner according to claim 1, wherein the vibration absorption material is a vibration absorption resin.

3. The air conditioner according to claim 1, further comprising:

an inside/outside air switching box having an inside air suction port through which air inside the passenger compartment is introduced, and an outside air suction port through which air outside the passenger compartment is introduced;

a switching member for selectively opening and closing the inside air suction port and the outside air suction port; and a second connection duct for connecting the inside/outside air switching box and the blower case, through which air flows from the inside/outside air switching box to the blower case, wherein the second connection duct is made of a vibration-absorption material.

4. An air conditioner for a vehicle having a supporting member for supporting a steering wheel unit, the air conditioner comprising:

a blower case defining an air passage;

a blower, disposed in the blower case, for blowing air into a passenger compartment;

a temperature adjusting unit for adjusting temperature of air blown by the blower;

an air conditioning case defining an air passage and accommodating the temperature adjusting unit; and a connection duct for connecting the blower case and the air conditioning case, through which air flows from the blower case to the air conditioning case, wherein;

the blower case and the air conditioning case are disposed to be supported by and to be fixed to the supporting member;

the connection duct is made of a vibration-absorption material;

the blower case and the air conditioning case have brackets, respectively, through which the blower case and the air conditioning case are fixed to the supporting member, the air conditioner further comprising a vibration-absorption member disposed between the supporting member and each of the brackets to absorb vibration by an elastic deformation of the vibration absorption member.

5. The air conditioner according to claim 1, wherein the connection duct is made of the vibration-absorption material which is different from a material for forming the blower case and the air conditioning case.

6. An air conditioner for a vehicle having a supporting member for supporting a steering wheel unit, the air conditioner comprising:

an inside/outside air switching box having an inside air suction port through which air inside a passenger compartment is introduced, and an outside air suction port through which air outside the passenger compartment is introduced;

a switching member for selectively opening and closing the inside air suction port and the outside air suction port;

a blower case for defining an air passage;

a blower fan disposed in the blower case, for blowing air sucked from the inside/outside air switching box into the passenger compartment;

a motor, for driving the blower fan, disposed in the blower case; and a first connection duct for connecting the inside/outside air switching box and the blower case, through which air flows from the inside/outside air switching box to the blower case, wherein the first connection duct is made of a vibration-absorption material; and the inside/outside air switching box and the blower case connected to the inside/outside air switching box by the first connection box are hung downwardly from the supporting member.

7. The air conditioner according to claim 6, wherein the first connection duct is made of the vibration-absorption material which is different from a material for forming the blower case and the inside/outside air switching box.

8. The air conditioner according to claim 6, further comprising:

an air conditioning case for defining an air passage through which air flows; and a temperature adjustment unit, for adjusting temperature of air blown by the blower fan, disposed in the air conditioning case.

9. The air conditioner according to claim 8, further comprising:

a second connection duct for connecting the blower case and the air conditioning case, through which air blown by the blower fan flows into the air conditioning case, the second connection duct is made of a vibration-absorption material with is different from a material for forming the blower case and the air conditioning case.

10. The air conditioner according to claim 4, wherein the vibration-absorption material is a vibration-absorption resin.

11. The air conditioner according to claim 4, wherein the connection duct is made of the vibration-absorption material that is different from a material for forming the blower case and the air conditioning case.

12. The air conditioner according to claim 4, wherein the blower case includes an inside/outside air switching box that has an inside air suction port through which air inside a passenger compartment of the vehicle is introduced and an outside air suction port through which air outside the passenger compartment is introduced.

* * * * *